(12) United States Patent
Ebtekar et al.

(10) Patent No.: US 8,997,000 B2
(45) Date of Patent: Mar. 31, 2015

(54) INTEGRATED VIEW OF NETWORK MANAGEMENT DATA

(75) Inventors: Ali Ebtekar, Palo Alto, CA (US); David Digirolamo, Menlo Park, CA (US); Mark Shurtleff, Oakland, CA (US); Rony Gotesdyner, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

(21) Appl. No.: 13/278,121

(22) Filed: Oct. 20, 2011

(65) Prior Publication Data

US 2012/0192075 A1    Jul. 26, 2012

Related U.S. Application Data

(60) Provisional application No. 61/436,601, filed on Jan. 26, 2011.

(51) Int. Cl.
*G06F 17/00* (2006.01)
*H04L 12/64* (2006.01)

(52) U.S. Cl.
CPC .................................. *H04L 12/6418* (2013.01)
USPC ............ 715/736; 715/733; 715/734; 715/737

(58) Field of Classification Search
None
See application file for complete search history.

(56) References Cited

U.S. PATENT DOCUMENTS

| | | | |
|---|---|---|---|
| 4,634,110 A | 1/1987 | Julich et al. | |
| 6,031,528 A * | 2/2000 | Langfahl, Jr. ................. | 715/734 |
| 6,993,686 B1 | 1/2006 | Groenendaal et al. | |
| 7,143,153 B1 | 11/2006 | Black et al. | |
| 7,249,170 B2 | 7/2007 | Tindal et al. | |
| 7,299,276 B1 | 11/2007 | Strawn | |
| 7,565,610 B2 * | 7/2009 | Li et al. ......................... | 715/736 |
| 7,721,157 B2 | 5/2010 | Spitz et al. | |
| 7,817,554 B2 | 10/2010 | Skog et al. | |
| 8,041,786 B2 | 10/2011 | Tindal et al. | |
| 8,156,207 B2 | 4/2012 | Wood et al. | |
| 8,316,113 B2 | 11/2012 | Linden et al. | |
| 8,320,388 B2 | 11/2012 | Louati et al. | |
| 8,429,535 B2 * | 4/2013 | Gammon et al. ............. | 715/737 |
| 2004/0075680 A1 * | 4/2004 | Grace et al. ................... | 345/734 |
| 2004/0139184 A1 | 7/2004 | Bantz et al. | |
| 2005/0049832 A1 | 3/2005 | Gorinevsky | |
| 2005/0198279 A1 | 9/2005 | Flocken et al. | |
| 2008/0065756 A1 * | 3/2008 | Hardwick et al. ............ | 709/224 |
| 2008/0155423 A1 * | 6/2008 | Moran et al. .................. | 715/736 |
| 2008/0282104 A1 | 11/2008 | Khan | |
| 2010/0159898 A1 * | 6/2010 | Krzyzanowski et al. .. | 455/414.1 |

(Continued)

*Primary Examiner* — Keith Bloomquist
(74) *Attorney, Agent, or Firm* — Hickman Palermo Becker Bingham LLP

(57) ABSTRACT

In an embodiment, a method comprises: receiving a first request for network management information, the first request identifying at least one of a user, a user device, or a user application; determining a first set of user information for a given user, the determination being based on the first request and data stored in a network database, identifying one or more interrelations in the first set of user information that represent logical connections within the first set of user information; creating a first information tree rooted at data representing a user location and organized according to the one or more interrelations, the first information tree being based on the first set of user information and being created in memory of a network management computer; and displaying, based on the first information tree, the one or more interrelations and the first set of user information, network management information for the user.

24 Claims, 9 Drawing Sheets

(56) References Cited

U.S. PATENT DOCUMENTS

| | | |
|---|---|---|
| 2010/0162036 A1 | 6/2010 | Linden et al. |
| 2010/0229096 A1* | 9/2010 | Maiocco et al. ............. 715/734 |
| 2010/0275263 A1 | 10/2010 | Bennett et al. |
| 2010/0299419 A1 | 11/2010 | Ramankutty et al. |
| 2010/0318487 A1 | 12/2010 | Marvasti |
| 2011/0061051 A1 | 3/2011 | Harber et al. |
| 2011/0066898 A1 | 3/2011 | Mcrory et al. |
| 2011/0126111 A1* | 5/2011 | Gill et al. ...................... 715/736 |
| 2011/0154208 A1* | 6/2011 | Horii ............................. 715/736 |
| 2011/0208567 A9 | 8/2011 | Roddy et al. |
| 2012/0191826 A1 | 7/2012 | Gotesdyner |
| 2012/0192016 A1 | 7/2012 | Gotesdyner |

* cited by examiner

US 8,997,000 B2

INTEGRATED VIEW OF NETWORK MANAGEMENT DATA

BENEFIT CLAIM; CROSS-REFERENCE TO RELATED APPLICATIONS

This application claims the benefit under 35 U.S.C. 119(e) of provisional application 61/436,601, filed Jan. 26, 2011, the entire contents of which are incorporated by this reference for all purposes as if fully set forth herein.

This application is related to U.S. patent application Ser. No. 13/178,386, filed Jul. 7, 2011, entitled Device-Health-Based Dynamic Configuration Of Network Management System Suited For Network Operations, by inventors Rony Gotesdyner and Barry Bruins.

This application is related to U.S. patent application Ser. No. 13/274,926, filed Oct. 17, 2011, entitled Managing Network Devices Based On Predictions Of Events, by inventors Rony Gotesdyner, Mark Shurtleff, Ali Ebtekar, and Barry Bruins.

TECHNICAL FIELD

The present disclosure is generally related to network management of devices in a distributed network infrastructure, and specifically relates to views of management data relating to endpoints, users and devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network performance monitoring applications usually collect, process and display network information in various formats, such as graphs, charts, panels and other displays. However, the collected and displayed information is usually application-specific, and provides only those network characteristics that were specifically requested by the individual applications. Usually, each application separately collects data and displays the collected data, but none of the applications generates a cross-application view of the network.

Furthermore, data collected by individual network monitoring applications is usually separately searchable and modifiable by the respective individual applications. However, the data sets collected by a multiplicity of applications are typically not linked with each other and do not provide an integrated view of the network.

DESCRIPTION OF EXAMPLE EMBODIMENTS

Figure 1:
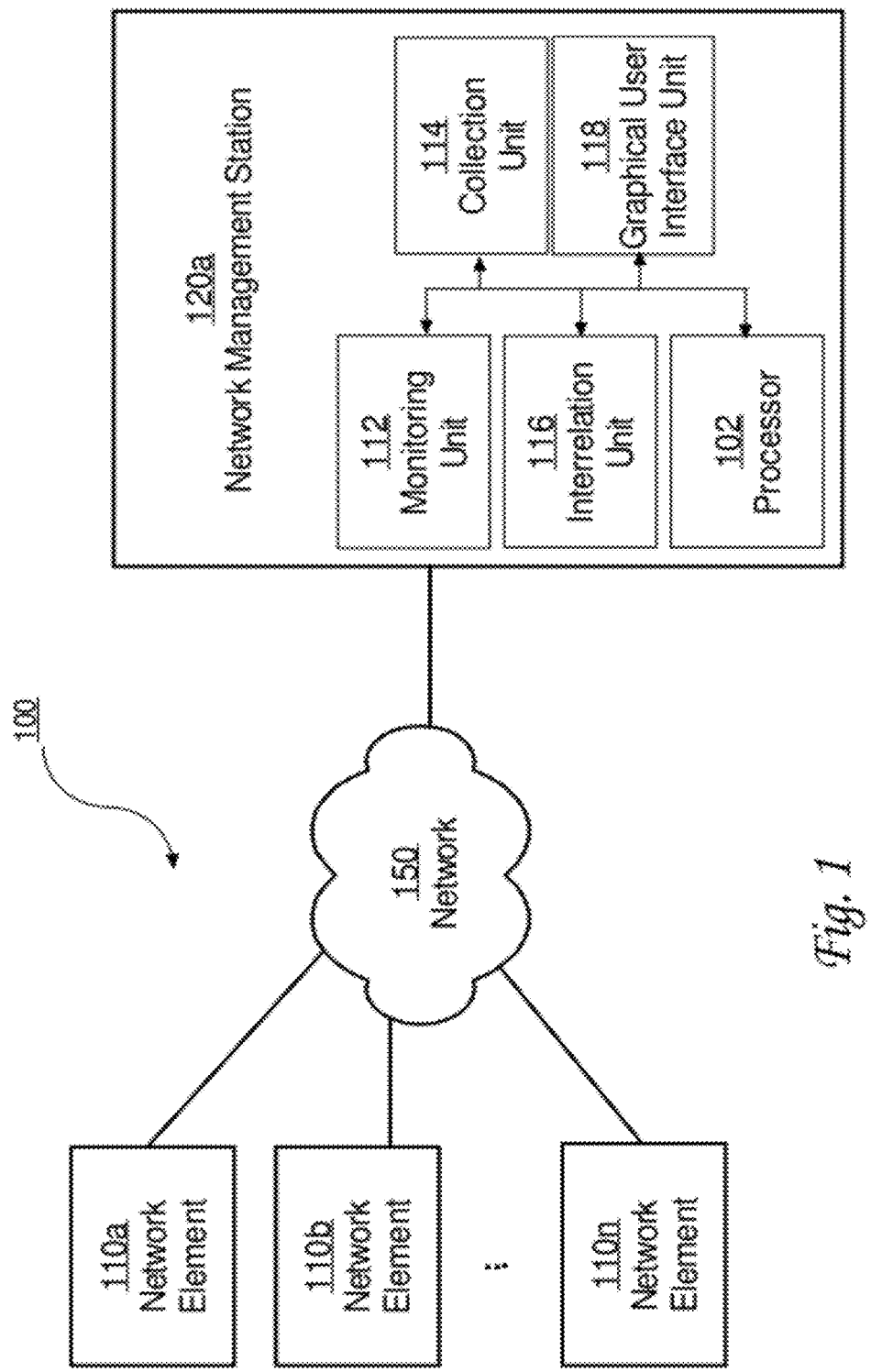
FIG. 1 illustrates an embodiment of a network management station configured for determining network information interrelationships and coupled to network elements.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 Overview
2.0 Structural and Functional Overview
3.0 Example Network Management Station
4.0 Example of an Integrated Tree
5.0 Examples of Operations Performed by a Network Management Station
6.0 Implementation Mechanisms—Hardware Overview
7.0 Extensions and Alternatives

1.0 Overview

In an embodiment, a method is presented for receiving a first request for network management information, the first request identifying at least one of a user, a user device, or a user application; determining a first set of user information for a given user based on one or more of network device access, a connection status, or consumption of applications, services, or data, the determination being based on the first request and data stored in a network database; identifying one or more interrelations in the first set of user information that represent logical connections within the first set of user information; creating a first information tree rooted at data representing a user location and organized according to the one or more interrelations, the first information tree being based on the first set of user information and being created in memory of a network management computer; and displaying, based on the first information tree, the one or more interrelations and the first set of user information, network management information for the user comprising one or more of user network device access, connection status, or consumption of applications, services or data.

In an embodiment, the method further comprises receiving a second request for different network management information for the user, the user device or the user application; based on the second request, the first information tree and the data stored in the network database, determining a second set of user information for the user; using the second set of user information, creating a second information tree, rooted at a particular interrelation selected from the one or more interrelations, and organized according to modified one or more interrelations in the second set of user information; causing displaying the different network management information for the user based on the second information tree, and the one or more interrelations and the second set of user information.

In an embodiment, the method further comprises causing displaying a graphical user interface (GUI) that comprises one or more panels, each of the one or more panels depicting one or more data histograms based on the one or more information trees and the one or more interrelations, and comprising one or more graphical user interface widgets that identify one or more operations; upon receiving a search query identifying the user, retrieving a user profile, displaying the user profile in a profile panel in the GUI, and displaying a data selection icon in the GUI; upon receiving user input selecting a sub-icon of the data selection icon, retrieving a portion of the one or more information trees and displaying the network management information for the user based on the portion.

In an embodiment, the network management information further comprises any of user location information, user configuration information, user network information collected by network monitoring processes executed in a communications network, user application information collected by application monitoring processes executed in the communications network, or user performance information collected by performance monitoring processes executed in the communications network.

In an embodiment, the network management information further comprises any of current, recent or historical information about endpoints of the connections that the user used to access the communications network, end-to-end breakdowns of paths that the user used, or applications, services and data consumption for each of the connections.

In an embodiment, the network management information further comprises multiple data metrics related to primary network objects and displayed in a single integrated view.

In an embodiment, the first set of user information comprises a history of resources usage by the user and a real-time usage of the resources by the user.

In an embodiment, the network management information further comprises user location information, user network information, user application information and user performance information.

In an embodiment, the network management information further comprises any of: a name of the user, an organization name for the user, contact information for the user, a picture of the user, an electronic mail interface, preference setting for the user, or an authorization and authentication interface.

In an embodiment, the method further comprises creating the one or more information trees and the one or more interrelations based on a real-time profile directory.

In an embodiment, an internet working device comprises one or more processors, a monitoring unit, a collection unit, a GUI unit that are configured respectively to perform processes described herein.

In an embodiment, a non-transitory computer-readable storage medium stores one or more sequences of instructions which, when executed by one or more processors, cause the one or more processors to perform the processes described herein.

2.0 Structural and Functional Overview

In an embodiment, a system creates and processes an integrated view of current, recent and historic network management data objects. In particular, a network management station stores and updates, in a database, user information, receives a user request to display an information tree for a user, and, based on the user request and data stored in the network database, determines a set of user information. Determining of the set of user information involves identifying interrelations in the set of user information that represent logical connections within the set of user information. The set of user information is used to build an information tree organized according to the interrelations. The information tree depicting the interrelations and the set of user information can be displayed in a browser.

FIG. 1 is a block diagram illustrating an example network 100 including a network management station 120a configured to create and process an integrated view of network management data. The integrated view of the network management data can, for example include objects associated with elements 110a through 110n, and connections established between elements 110a through 110n, sub-network 150, and other network components. In an embodiment, a network management station 120a is configured to receive requests and queries from a system administrator, a network engineer, a network manager, or any network element 110a through 110n.

In an embodiment, elements 110a through 110n can represent one or more network elements, all or some of which can be used by one or more users. Examples of network elements can include one or more user devices, one or more switch ports, one or more access points, one or more switches, one or more controllers, and/or any other network elements supporting connectivity with network 100.

For purposes of illustrating clear examples, FIG. 1 shows elements 110a, 110b, and 110n, one network manager device 120a, and one sub-network 150. However, practical embodiments may use any number of elements 110, network manager devices 120a and sub-networks 150.

In an embodiment, a sub-network 150 is communicatively coupled to elements 110a through 110n, and network manager device 120a. Sub-network 150 is used to maintain various communications sessions and may implement one or more communications protocols.

Network elements 110a through 110n and network manager device 120a can be any type of a workstation, laptop, PDA device, phone, or a portable device.

Network elements 110a through 110n, and network manager device 120a may implement the processes described herein using hardware logic such as in an application-specific integrated circuit (ASIC), field-programmable gate array (FPGA), system-on-a-chip (SoC) or other combinations of hardware, firmware and/or software.

In an embodiment, network elements 110a through 110n, network manager device 120a, and sub-network 150 comprise hardware or software logic configured to generate and maintain various types of communications session information, and routing information for data communications network 100.

For purposes of illustrating clear examples, FIG. 1 shows that management station 120a comprises one processor 102, one monitoring unit 112, one collection unit 114, one interrelation unit 116 and one GUI unit 118. However, in practical embodiments, network management station 120a may comprise one or more processors 102, one or more monitoring units 112, one or more collection units 114, one or more interrelation unit 116 and one or more GUI unit 118.

In an embodiment, a processor 102 facilitates communications to and from network management station 120a, processes commands received by and executed by network management station 120a, processes responses received by network management station 120a, and facilitates various types of operations executed by network management station 120a. Processor 102 comprises hardware and software logic configured to execute various processes on network management station 120a.

In an embodiment, a monitoring unit 112 is configured to monitor traffic flow between network devices 110a through 110n, configuration and status of network devices 110a through 110n, function and application calls initiated by the users operating one or more network devices associated with network 100, characteristics of communications connections established for the users operating one or more network devices, and other types information useful for creating an integrated view of current, recent and historic network management data objects in network 100.

In an embodiment, a monitoring unit 112 comprises one or more application modules providing one or more interfaces to one or more collection units 114. The application modules can be configured to search, retrieve, modify, update, delete and/or expand information collected by the collection units.

In an embodiment, a collection unit 114 is configured to collect various types of information about network devices 110a through 110n, components of network 100, communications sessions involving network devices 110a through 110n, users, user applications, and other types of information useful to monitoring unit 112.

Some types of the information may be collected online by the components of network devices 110a through 110n as they execute their functions. Other types of information may be collected by sending probes and requests to individual components of network devices 110a through 110n. Other types of information may be collected by dedicated monitoring units (such a monitoring unit 112) that store the collected information in storage resources that are available to network manager 120a.

In an embodiment, an interrelation unit 116 is configured to determine the relations between components of network 100, the relations between communications links established in network 100, function and application calls exchanged between the applications executed by the users and the users' devices present in network 100, and the interrelations between processes executed by the users of network 100.

In an embodiment, the interrelations represent logical connections that can be established within a set of user information. For example, the interrelations for a user using network element 110a can represent logical connections that are present in a set of information gathered for the user's device 110a. That can include the logical connections established between the user's device 110a and other devices that the user is using, and the logical connections established between the user's devices and the switch ports and access points to which the user's devices are connected. The logical connections also include the logical connections established between the switch ports and access points and the switches and controllers through which the switch ports and access points communicate with network 100, and other logical connections that can be determined for the user using network element 110a. For example, if a user is using a computer notebook, and the notebook is connected via a particular switch port to a particular switch, then the user, notebook, particular port and the particular switch are interrelated.

In an embodiment, the interrelations represent logical connections that can be established within a set of information related to a user's device. For example, the interrelations for a user's device 110b can represent logical connections that are present in a set of information gathered for user's device 110b. For instance, if network device 110b is a switch, then the interrelation information can include the logical connections established between the switch and the switch ports through which other devices communicate with the switch. The logical connections also include the logical connections established between the switch ports and other devices that communicate via the switch ports, and the logical connections established between user devices and the other devices that the users use to communicate via switch 110b.

In an embodiment, upon identifying one or more interrelations, interrelation unit 116 uses the interrelated information to generate an information tree organized according to the one or more interrelations.

In an embodiment, upon receiving a search query identifying a user, interrelation unit 116 retrieves a user profile and provides one or more instructions causing the user profile to be displayed in a GUI. In some embodiments, the user profile is displayed in a user profile panel of a GUI. In some embodiments the user profile is displayed along with a contextual links selection icon in the GUI. As will be described further below with reference to FIGS. 3, and 6-8, upon receiving user input selecting a sub-icon of a contextual links selection icon, interrelation unit 116 can retrieve a portion of one or more information trees and display the requested information. The requested information can be displayed in a browser or any other display generated by interrelation unit 116.

In an embodiment, interrelation unit 116 receives a query requesting additional information about an element of an already displayed information tree. For example, the query may request additional information about a particular communications connection, a particular switch, a particular controller, or other device included in the information tree.

In response to receiving the query, interrelation unit 116 processes and/or modifies one or more information trees, alternatively generates a new information tree rooted at the element for which the additional information was requested, and displays the additional information in a browser or other display generated by interrelation unit 116.

In an embodiment, a GUI unit 118 is configured to generate a GUI on a display communicatively coupled to network manager 120a. The GUI may comprise various panels. The panels may be used to display performance measurements data collected for the users, devices, network components and communications links present in network 100.

In an embodiment, GUI unit 118 is configured to display a GUI that comprises one or more indicators representing characteristics of network elements 110a through 110n, connections between the network elements, communications links, and other information specific to communications traffic in network 100.

In an embodiment, a GUI comprises a panel for displaying one or more information trees depicting one or more interrelations identified in a set of user information or in a set of device-related information.

In an embodiment, a GUI comprises one or more panels, each of the one or more panels depicting one or more data histograms, one or more information trees, one or more interrelations, and other network-related information. The GUI can comprise one or more GUI widgets that allow performing one or more operations with respect to the panels.

Furthermore, a GUI can include panels with displays indicating the current CPU resources, memory resources, bandwidth, and information about other resources that the operations executed on network device 110a may require. Examples of various panels of the GUI are described further below in reference to FIG. 5, FIG. 6, FIG. 7, and FIG. 8.

3.0 Example Network Management Station

Figure 2:
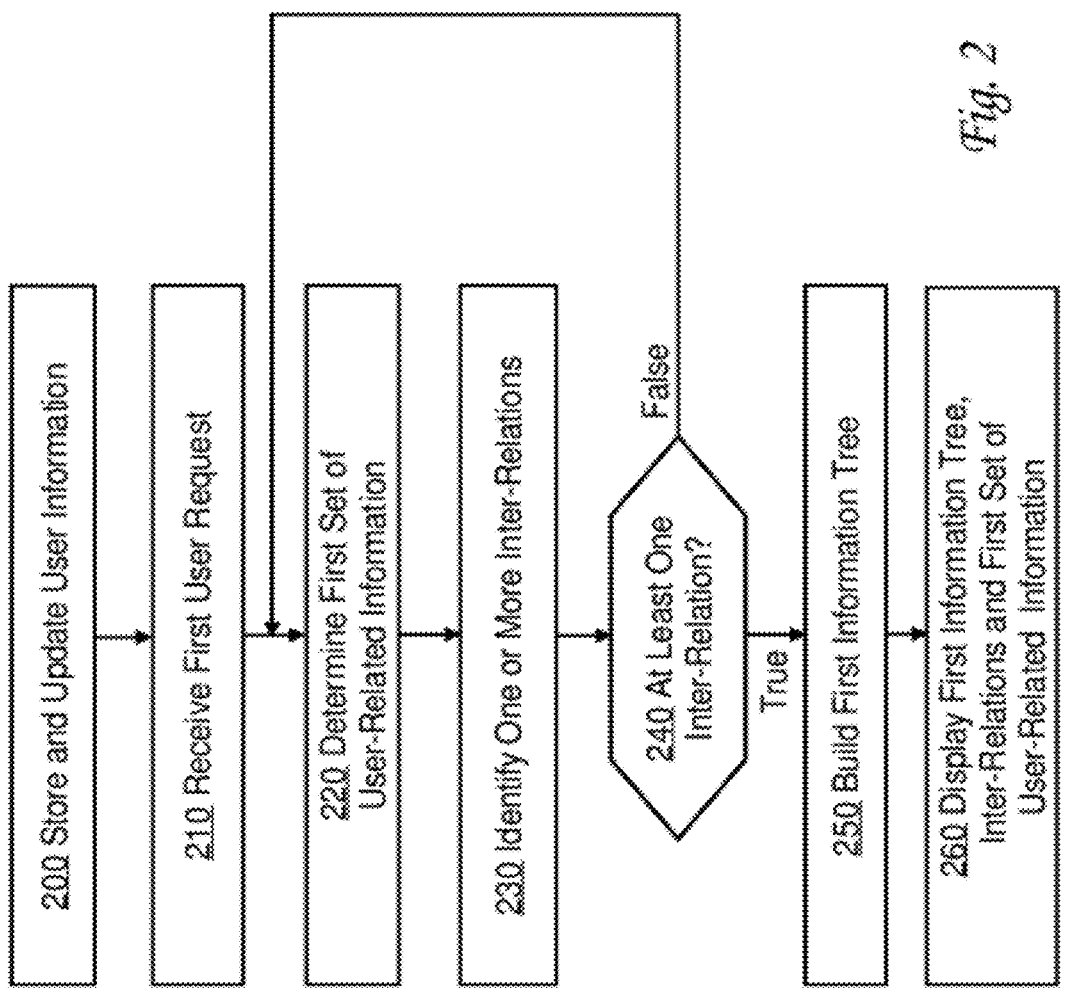
FIG. 2 illustrates an embodiment of a process of determining interrelated information associated with a user and relating to network management.

FIG. 2 is a block diagram of an example method of operating a network management station 120a. However, in practical embodiments, the operations depicted in FIG. 2 may be performed by units configured on any device 110a through 110n and 120a.

In an embodiment, network management station 120a can receive requests and queries from a system administrator, a network engineer, a network manager, or any device 110a through 110n.

In an embodiment, at block 200, a network management station 120a stores and updates user information. The user information can be collected from a variety of sources and by a variety of processes, tools and applications. For example, the user information can be collected from manual feeds from various processes, from client processes, authentication, authorization and accounting services, directory services, RADIUS processing applications and other processes/applications/tools and utilities.

In an embodiment, the user information comprises various types of information about a user, devices that communicate data for the user, applications that the user is executing, and other application that support the user and the user's devices. For example, the information can comprise user location information, user configuration information, user network information collected by network monitoring processes executed in a communications network, user application information collected by application monitoring processes executed in the communications network, and user performance information collected by performance monitoring processes executed in the communications network.

The user information can be stored in a variety of data storage structures and databases. The user information can be organized in different folders, stored on one or more servers, and protected using various types of security measures, encryption schemes and access policies. The user information stored as associated with a particular user is referred to as user-related data.

In an embodiment, user-related data comprise any of current, recent or historical information about devices that the user used to access the communications network, connections that the user used to access the communications network, endpoints of the connections that the user used to access the communications network, end-to-end breakdowns of paths that the user utilized, and applications, services and data consumption for each of the connections. Furthermore, the user data can comprise multiple data metrics related to primary network objects and displayed in a single integrated view, a history of resource usage by the user and a real-time usage of resources by the user, and other statically and dynamically collected information about the user's activities.

In an embodiment, the user data can be organized based in a user centric model that is optimized for the communications network.

In an embodiment, user-related data are used by reporting, troubleshooting, compliance, security and policy-based applications. The user data represents a data model for the user that is captioned at a given moment in time.

In an embodiment, user data comprise location information, network information, application information, and performance information;

In an embodiment, user data can comprise any of: a name of the user, an organization name for the user, contact information for the user, a picture of the user, an electronic mail interface, preference setting for the user, an authorization and authentication interface configured to verify the user's credentials, a particular interface available to the user and other user information.

At block 210, a network management station receives a first request to display a first information tree for a given user. The first request can be sent from, for example, a any person that would like to receive a graphical view of the summary of information about the user's devices, services, policies and device performance such as, for example, the user himself or herself, a system administrator, or a network engineer.

The request can be combined with a problem report indicating that one or more user devices or services are not performing as expected. For example, if a user experiences quality degradation in performance of one or more user applications, then the user can send a request to display an information tree and a request to troubleshoot a part of the network to determine the cause for the performance quality degradation At block 220, a network management station determines a first set of user information for the user based on the first user request and data stored in the network database. For example, the network management station can search the collected data and determine the user's devices, services and policies, as well as characteristics and performance measurements for the user's devices, links between the devices, applications, and other measurements.

At block 230, a network management station identifies one or more interrelations in the first set of user information that represent logical connections within the first set of user information. For example, if a user is using a computer notebook, and the notebook is connected via a particular switch port to a particular switch, then the user, notebook, particular port and the particular switch are interrelated. The interrelation between the user and the user's notebook can be represented as a link connecting the user and the user's notebook. Similarly, the interrelation between the user's notebook and the particular port can be represented as a link connecting the user's notebook with the particular switch port. Also, the interrelation between the particular switch port and the particular switch can be represented as a link connecting the particular switch port with the particular switch.

At block 240, a network management station determines whether at least one interrelation is present in the first set of user information. For example, the network management station can determine whether the user is communicating with the network using one or more user devices. If so, then the network management station determines that there are interrelations between the switch ports and access points that the user's devices are using to communicate with the network, and interrelations between the switches and controllers that the user's devices are using to communicate with the network. In this example, there are interrelations between the user and the user's devices, interrelations between the user's devices and the switch ports and access points, and interrelations between the switch ports, access points, switches and controllers.

In response to determining that there is at least one interrelation in the first set of user data, a network management station proceeds to block 250. Otherwise, the network management station determines another first set of user information in block 220.

At block 250, using the first set of user information, a network management station builds the first information tree organized according to the one or more interrelations. For example, if a request was received from a user and the interrelations information tree was built with a user as a root of the interrelations information tree, then the interrelations tree can include the devices that the user is using, the links between the user and the user's devices, the switch ports and access points that the user's devices are using, the switches and controllers that the user's devices are using, and the respective links between the user's devices, switch ports, access points, switches and controllers.

Furthermore, the interrelations information tree can comprise information specific to each individual node of the tree and each individual link of the tree. For example, the interrelations information tree can comprise information about the devices' names, devices' IP addresses, devices' MAC addresses, policies associated with the executing processes/applications on the user's devices, and other information specific to the user's devices. Furthermore, the interrelations information tree can comprise information about the link's performance, the link's characteristics, packet loss characteristics of the links, and other information related to the links included in the interrelations information tree.

At block 260, a network management station displays the first information tree depicting the one or more interrelations and the first set of user information.

In an embodiment, an interrelations information tree represents a snapshot of the data model created and maintained for the user. The snapshot can be represented in one or more forms. For example, the snapshot can be displayed as a tree-structure in a browser. The interrelations information tree can also be displayed in a GUI.

The snapshot can be searchable, modifiable and reorganized. For example, the snapshot can be reorganized by selecting one of the non-root nodes of the interrelations information tree as a new root, and reorganizing the interrelations information from the perspective of the new root.

In an embodiment, displaying a GUI comprises displaying one or more panels, each of the one or more panels depicting one or more data histograms, and representing one or more information trees and the one or more interrelations. The GUI can comprise one or more GUI widgets that identify one or more operations.

In an embodiment, a network management station can receive a second user request to display a second information tree, centered at a particular interrelation selected from the already displayed first information tree. For example, if the first information tree was centered at the root-user, then the network management station can receive a second request from the user (or from a system administrator) to explore one of the communications links established between the one of the user's devices and a particular switch port. By further exploring the particular communications link, a system administrator can proceed to in-depth trouble shooting of the problem reported by the user. For example, by exploring the particular communications link, the system administrator can determine a level of functionality of the link, a ratio of packet's loss, a link throughput, or any other information specific to the performance of the link.

In an embodiment, based on the second user request, the first information tree and the data stored in the network database, the network management station determines a second set of user information for the user.

Using the second set of user information, the network management station can determine the second information tree, centered at the particular interrelation, and organized according to modified one or more interrelations in the second set of user information.

In an embodiment, a network management station displays the second information tree depicting the particular interrelation, the modified one or more interrelations and the second set of user information.

Figure 3:
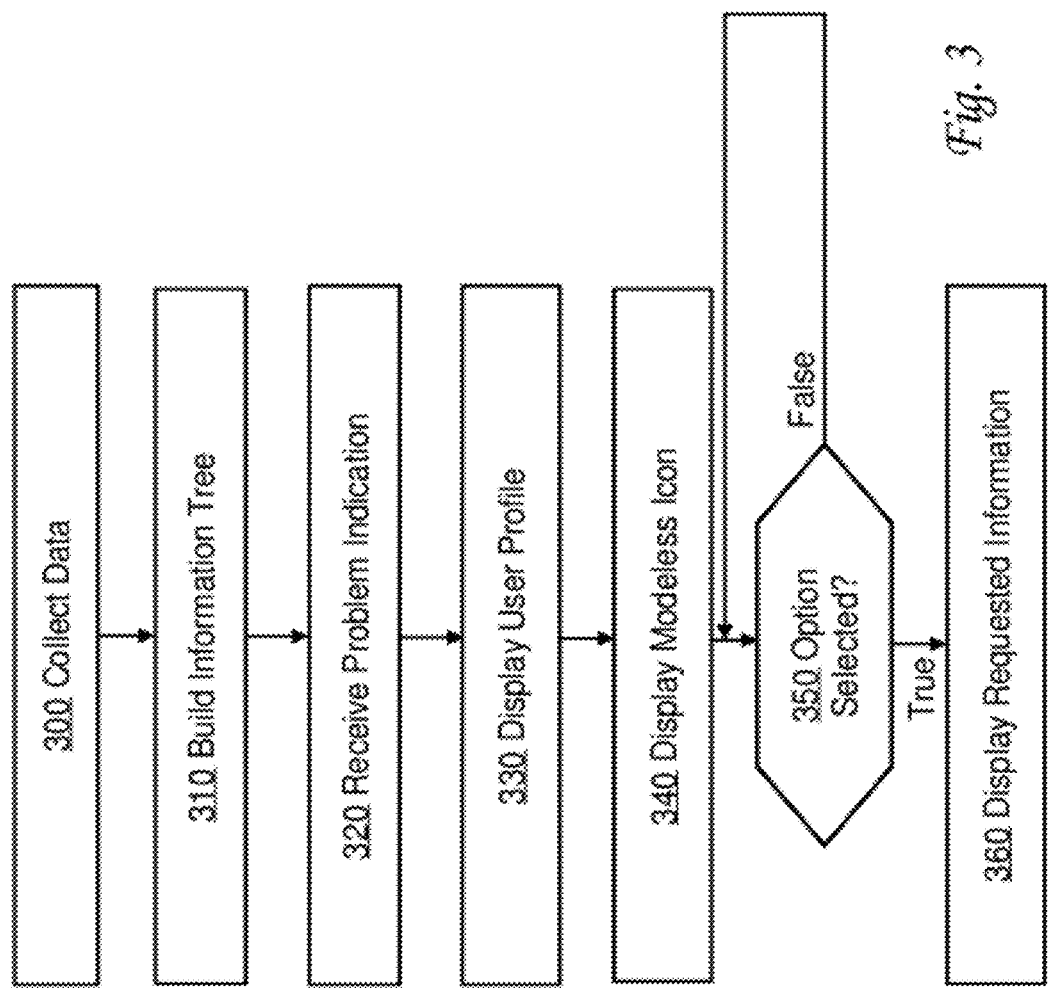
FIG. 3 illustrates an embodiment of a process of operating a network management user interface.

FIG. 3 is a block diagram of example operations of a network management station.

At block 300, a network management station collects user's information and device's information. Examples of the user's information and device's information are described above at block 200 of FIG. 2. Examples of the methods and approaches for collecting the user's information and information about devices and applications are also described at block 200 of FIG. 2.

At block 310, a network management station builds an interrelations information tree for the user. For example, the network management station uses the user's information, the user's devices information, and any other information related to the user and the user's devices. Example approaches to creating an interrelations information tree are described in block 220-250 of FIG. 2.

At block 320, a network management station receives a problem indication. The problem indication can be received from a user who, for example, noticed quality degradation in performance of, for example, a collaboration application, or a loss of connectivity along a TCP/IP session established for the user. According to another example, the problem indication can be received from a system administrator or a network engineer who, for example, noticed that one of the servers reports an unusual packet loss transmitted from the particular service. In other embodiments, a network management station causes displaying of a user's profile upon receiving a service call at a call center, or upon routine system check for compliance.

At block 330, a network management station causes connectivity contextual information for a user to be displayed. The connectivity contextual information for a user can be expressed in a variety of forms, including a profile for the user. An example of the user's profile and examples of the types of information presented in the user's profile are provided in FIG. 5.

At block 340, a network management station causes a contextual links selection icon to be displayed. The contextual links selection icon can be displayed as an overlay projected on the top of already displayed windows, charts, and other objects on a display device communicatively coupled to the network management station.

In an embodiment, a contextual links selection icon provides one or more sub-icons that provide links to additional options for troubleshooting the reported problem. The additional options can refer to the specific characteristics of the components of the interrelations information tree. For example, the additional options can allow gathering additional information about the individual nodes, individual links, specific characteristics of the nodes and/or links, or other elements of the interrelations information tree.

At block 350, a network management station determines whether any of the sub-icons of the contextual links selection icon was selected. If so, then the network management station proceeds to performing block 360. Otherwise, the network management station continues testing whether any of the options of the contextual links selection icon was selected, or whether any other approach to troubleshooting is being pursued by a system administrator.

At block 360, a network management station displays information requested by the selected troubleshooting option. Collecting and/or generating the requested information can require taking another snapshot of the user's data model, or modifying an already generated integrated view of the interrelations information tree, described above. For example, if the first interrelations information tree was a snapshot of the user's data model and was rooted at the user as a root, and the additional trouble shooting option required focusing on a particular device, then the first interrelations information tree can be reorganized or modified to generate a second interrelations information tree that has the particular device as a root.

Operations at blocks 340-360 can be repeated as the troubleshooting process progresses and as a network administrator requires additional information about the devices and services. As the collecting of the additional information progresses, new snapshots of the user-related data model are generated and new interrelations information trees are created.

In an embodiment, new snapshots and information trees are generated in parallel to collecting and organizing the information about the users, the devices and services. As the new information about the users, devices and services becomes available, the snapshots and information trees can be updated and/or generated from the updated information.

Collecting and organizing the information allows merging information across various applications, various sources and various characteristics. The snapshots and information trees are generated as comprehensive representations of data, and capture a variety of interrelations between their components.

In an embodiment, a model related to a user is generated. The user's related model provides a progressive disclosure of co-related data. In some instances, generating the user's related model can require determining additional details about the particular item. It can comprise determining multiple paths for processing the first information tree, and drilling-down the first information tree.

In an embodiment, a model related to a user is a user-centric model that captures relationship between users, devices, device ports, communications links, application flows and collaboration session in a communications network.

In an embodiment, a model related to a user is a human-centric model that serves as a real-time directory for determining one or more information trees and the one or more interrelations.

4.0 Example of an Integrated Tree

Figure 4:
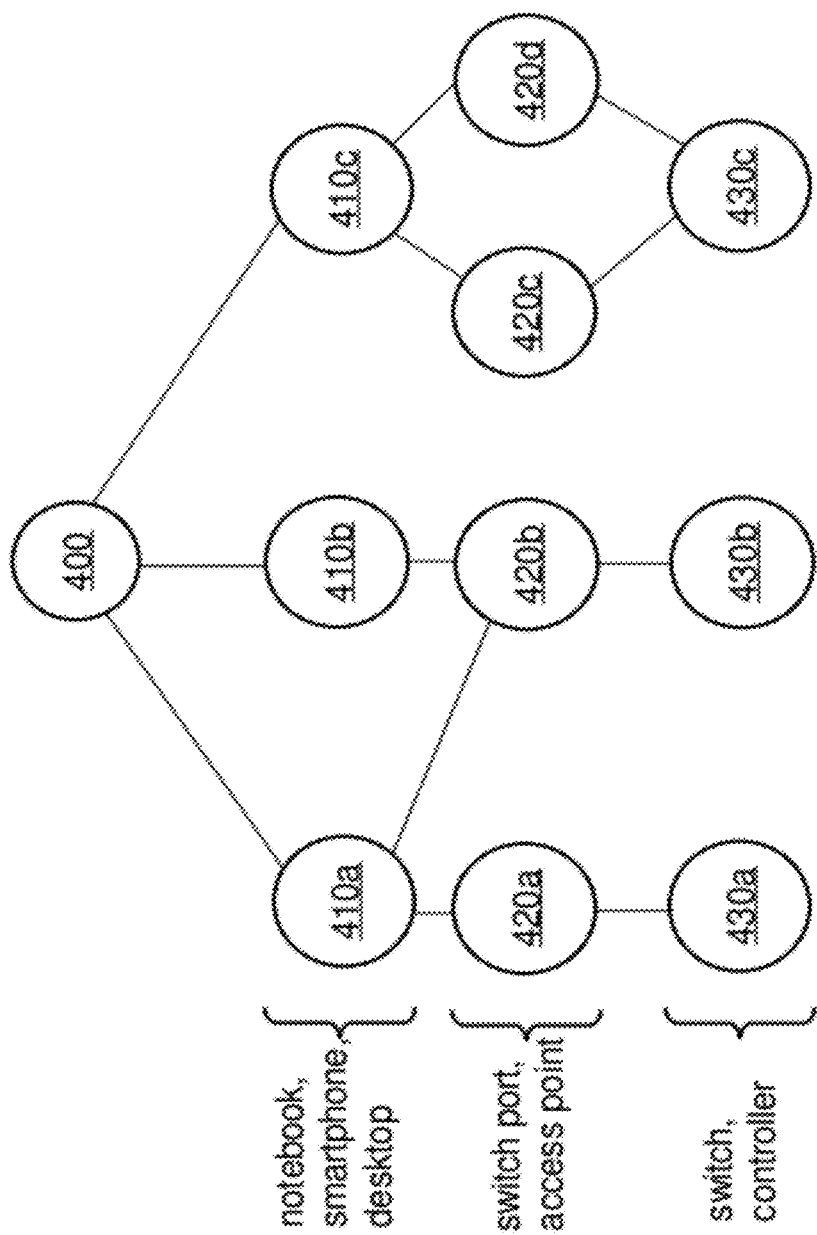
FIG. 4 illustrates an embodiment of an interrelations information tree.

FIG. 4 illustrates an embodiment of an interrelations information tree. The interrelations information tree provides a graphical representation of the network components and relations established between the components. The interrelations information tree is built for a root (node 400) and the elements that directly or indirectly communicate with the root.

In an embodiment, an interrelations information tree is constructed for a user. In such a tree, a root 400 of the tree represents the user.

In an embodiment, the objective for constructing the interrelations information tree is to generate a graphical representation of devices that are used by the user and the components with which the devices communicate. For example, if a user gains access to a network via a computer notebook, a respective interrelations information tree can include the user's node (400), a notebook node 410*a*, which is directly connected to the user's root 400, and other devices with which the notebook node 410*a* communicates.

In the example depicted in FIG. 4, an interrelations information tree comprises a first tier node, namely a root 400, a first level of nodes, namely nodes 410*a*, 410*b* and 410*c*, a second level of nodes, namely nodes 420*a*, 420*b*, 420*c* and 420*d*, and a third level of nodes, namely nodes 430*a*, 430*b* and 430*c*. However, other examples of the interrelations information trees can comprise more or less than three levels of nodes. Furthermore, in other examples of the interrelations information trees, each of the node tiers can comprise more or less than three nodes. The configuration of the tree is flexible and depends on specifics of the user, devices and services.

In the example depicted in FIG. 4, in addition to the root 400, an interrelations information tree comprises first level nodes, second level nodes and third level nodes. The first level nodes include a notebook 410*a*, a smartphone 410*b*, and a desktop 410*c*. The second level nodes include a switch port 420*a*, an access point 420*b*, a switch port 420*c* and a switch port 420*d*. The third level nodes include a switch 430*a*, a controller 430*b* and a switch 430*c*.

As depicted in FIG. 4, the user uses three devices, a notebook 410*a*, a smartphone 410*b* and a desktop 410*c*. Notebook 410*a* communicates with a switch 430*a* via a switch port 420*a*, and communicates with a controller 430*b* via an access point 420*b*. Smartphone 410*b* communicates with a controller 430*b* via an access point 420*b*. Desktop 410*c* communicates with a switch 430*c* via a switch port 420*c* or a switch port 420*d*.

In an embodiment, links between the nodes in the interrelations information tree represent communications links established between the respective devices. For example, a link between 410*a* and 420*a* represents a communications link between a notebook 410*a* and a switch port 420*a*, along which the notebook and the switch port exchange communications packets.

In an embodiment, nodes and links of the interrelations information tree include additional associated information, such as, for example,the node's name, node's IP address, node's MAC address, a policy associated with the node, a policy associated with the node, a policy associated with the communications link, link load, link bandwidth, packet loss information, packet re-transmission rate, and/or any other information specific to the nodes and/or to the links.

In an embodiment, information stored in association with the interrelations information tree is static information, and can include physical and/or logical information of the network configuration, established communications connections and other types of information.

In an embodiment, information stored in association with the interrelations information tree is dynamic information, and can represent changes in the status of the user's devices, changes in the status of the user's communications links, changes in the user's access to the network, changes in availability of the network's resources and other dynamically changing information.

In an embodiment, information used to generate and organize the interrelations information tree is collected from various sources and by various entities. For example, the information can be provided by manual feeds from individual users, devices, applications, and processes. Furthermore, the information can be provided in response to queries to other information systems. Moreover, the information can be provided from authentication, authorization and accounting (AAA) servers, servers specializing in collecting device specific information, devices configured to collect information related to specific protocol calls, such as RADIUS calls, and other devices configure to gather information about users, devices, services and processes executed in the network. Also, the information can be provided by various computer directory services, troubleshooting applications, system testing applications, sniffers, application debugging applications, and other applications designed to access data traffic and/or designed to maintain information databases.

In an embodiment, an interrelations information tree is a collection of related pieces of information that are owned, collected or derived by a variety of applications. For example, presence of different devices can be identified using various applications such a ping, echo, or other commands or applications. Furthermore, the switch ports and access points can be identified using any of network troubleshooting commands or applications.

In an embodiment, an interrelations information tree is a snapshot of an information model created and maintained for a root of the interrelations information tree. As further described for FIG. 5, FIG. 6, FIG. 7, and FIG. 8, the interrelations information tree comprises information about the user (root 410), the devices that the user is using (notebook 410a, smartphone 410b and desktop 410c).

An interrelations information tree can also comprise information about the ports and access points that the user's devices are using (switch port 420a, access point 420b and switch ports 420c-420d), and the switches and controllers that the user's devices are using (switch 430a, controller 430b and switch 430c).

As will be described below with reference to FIG. 5, FIG. 6, FIG. 7, and FIG. 8, an interrelations information tree can also comprise information about the user, the names and address of the devices that the user is using, the links between the user's devices, the policies associated with the user's devices and communications links, packet loss, link characteristics, and other information.

In an embodiment, an interrelations information tree is reconfigurable and modifiable. For example, if any portion of the dynamic information of the interrelations information tree changes, the tree can be updated according to the change. Furthermore, information stored in the interrelations information tree can be reorganized by selecting another root node and presenting the information in relation to the newly selected root. For example, for the interrelations information tree designed for a user (root 400), another node can be selected as a root, and the information can be reorganized according to the interrelations determined with respect to the new root.

5.0 Examples of Operations Performed by a Network Management Station

FIG. 5, FIG. 6, FIG. 7, FIG. 8 illustrate embodiments of a GUI that may be generated by various methods herein or by network management station 120a.

Figure 5:
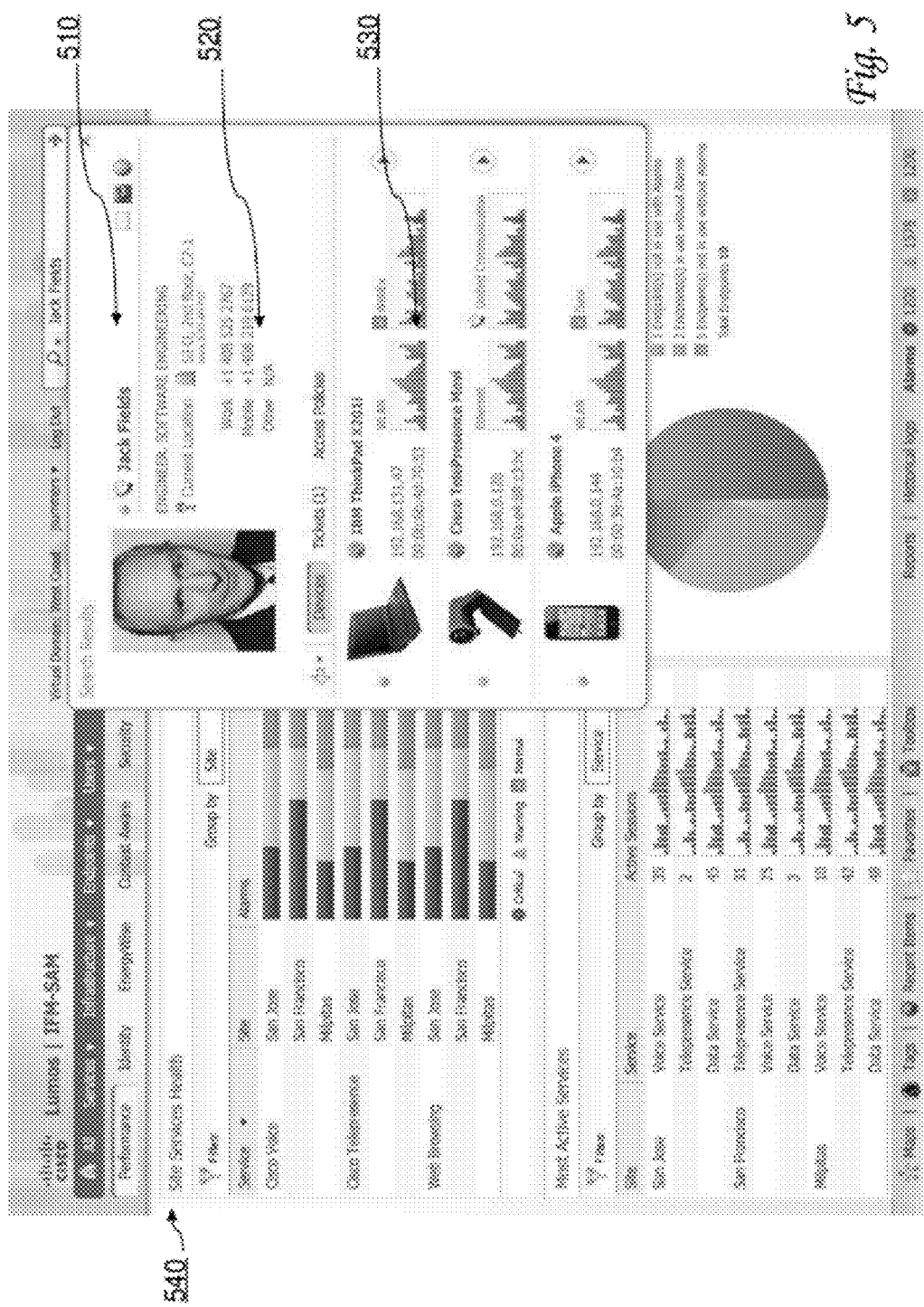
FIG. 5 illustrates an embodiment of a network management graphical user interface (GUI) providing an integrated view of network management data objects.

FIG. 5 illustrates a GUI for a scenario in which a user contacts a system administrator or a system engineer, and reports degradation in quality of communications with regard to collaboration applications. For example, a user who operates a network device 110a communicates with a system manager that operates a network management station 120a, as depicted in FIG. 1. Network device 110a can be communicatively connected with network management station 120a via a sub-network 150, as also depicted in FIG. 1.

In an embodiment, a user, using a network device 110a, contacts a system administrator and reports that his communications connection that, for example,supports a collaboration application is under performing. The report can be provided to the system administrator in a form of a telephone message, an email, an instant messaging (IM) message, an alarm pop-up message, an alarm icon, or in any other form of communicating information to the system administrator.

Upon receiving a message/alarm about degradation of the communications quality in the collaboration applications, a network management station displays an integrated view 540, as depicted in FIG. 5, of the communications network that includes the user.

In an embodiment, the system administrator retrieves a profile 510 for the user. The user profile 510 can be stored in a database communicatively coupled with a network management station. To retrieve the user profile, the system administrator can provide to the database the user's identification information, such as the user's login name, user's identification number, user's alias name, or any other identification information. Alternatively, the system administrator can cause displaying one or more organizational charts, and select the user's profile from the organizational charts with which the user is associated.

In an embodiment, the user's profile comprises a variety of information associated with the user. For example, the user profile 510, depicted in FIG. 5, provides the user's name ("Jack Fields"), the user's title in the organization, the user's contact information, such as,for example. the user's location, the user's office address, the user's telephone contact information, and/or other information specific to the user can be displayed in user profile area 520.

Furthermore, the user profile 510 can provide information about the devices that the user is using at a present moment, or about the devices from which the user has established any form of communication with the network. For example, as depicted in FIG. 5, the user ("Jack Fields") is communicating with the network via laptop computer, video-conferencing equipment, and a smartphone. In other examples, the user can use any other computing or communications devices.

In an embodiment, for each device utilized by the user, the user's profile provides information specific to the devices. For example, for a particular computer, the user's profile can provide information about the device IP address, the device MAC address, and characteristics of the communications links or session established with the device in user profile area 530. Providing a comprehensive display of the user's profile can require traversing an interrelations integrated tree built for the user, the user's devices, the services and the connections, described above.

In an embodiment, by inspecting a user profile 510, the system administrator can determine whether any of the user's devices or the communications links is malfunctioning, whether any additional information about the user's devices or the communications links is required, and what type of additional information may be required to troubleshoot the user's devices and communications link to determine the cause of degradation in performance of the user's collaboration application. For example, by inspecting a user profile 510, the system administrator can narrow down the quantity of the user's devices, and test connectivity between the selected devices, as opposed to test each device in the network.

Figure 6:
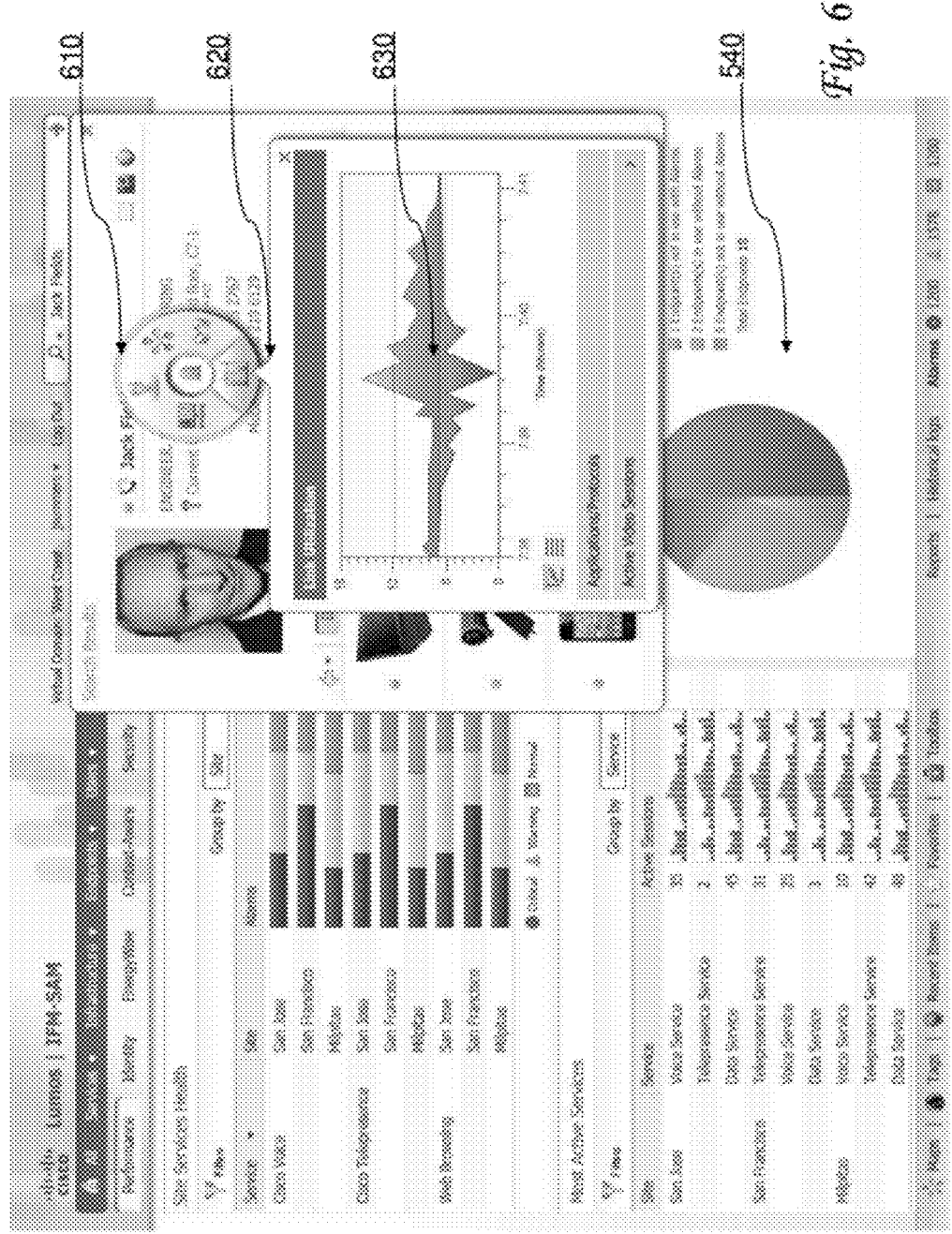
FIG. 6 illustrates the GUI of FIG. 5 with additional graphical elements.

FIG. 6 illustrates a GUI for a scenario in which, upon receiving a report of quality degradation in a user's collaboration application, a system administrator tries to troubleshoot the problem using an integrated interrelations tree. For example, a user who operates a network device 110a communicates with the system manager who operates a network management station 120a, as depicted in FIG. 1, and the system administrator troubleshoots the user's devices and the services provided to the user's devices.

In an embodiment, the system administrator requests a display of a contextual links selection icon 610 that provides additional troubleshooting options. The contextual links selection icon 610 can be displayed as a semi-transparent overlay that is projected on the top of the windows, icons and other objects already displayed on the display associated with the network management station.

In an embodiment, a contextual links selection icon 610 is used to provide sub-icons, which in turn, provide links to additional troubleshooting options. The data selection icon can be used to rearrange at least a portion of the one or more information trees and display the rearranged information in a browser.

In an embodiment, the system administrator displays the contextual links selection icon that has several sub-icons for invoking additional troubleshooting options. The additional options can include a request to provide additional information about link utilization. The sub-icons can include indicators for various types of information, such as performance metrics of provisioned network services for that particular site, information about the security/AAA services (such as failed/successful authentications/authorizations), geo/topology info of the site, and performance/health status of network devices (such as routers, switches, and access points) related to the site.

In an embodiment, the sub-icons depend on starting information provided for the user, information that in some way "complements" the user, information pertaining to the end-user devices and applications.

In an embodiment, selecting a sub-icon 620 for link utilization information causes displaying a contextual view of link utilization in GUI area 630. Displaying a contextual view 630 of utilization of a link causes generating and delivering a display of a graph representing the link utilization plotted against a time axis, as it is depicted in FIG. 6.

From a link utilization graph, a system administrator can determine additional information that can be helpful in troubleshooting collaboration activity degradation problem. For example, the system administrator can determine whether there is any congestion issue persistent along the link that the user is utilizing while executing a collaboration application. Providing the comprehensive display of the link utilization graph can require traversing an interrelations integrated tree built for the user, and retrieving information specific to the user's devices, the services and the connections, described above.

In the example depicted in FIG. 6, a system administrator can determine that there does not seem to be any significant congestion problem persisting along the user's links. Subsequently, the user can investigate whether there are any problems with communications sessions established for the user, and verify whether there are any problems with the policies that control the user's devices and the user's services.

Figure 7:
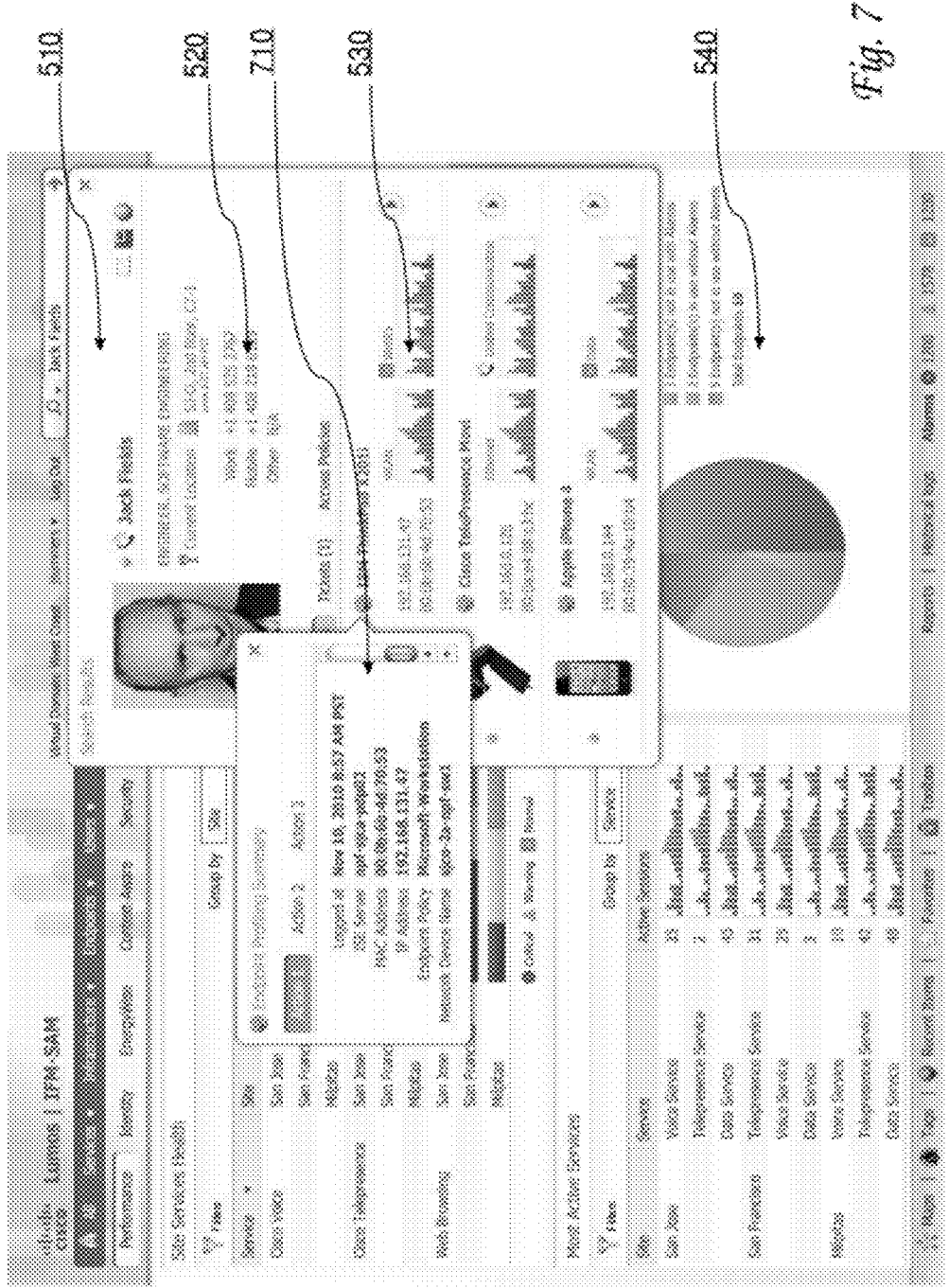
FIG. 7 illustrates the GUI of FIG. 5 with other additional graphical elements.

FIG. 7 illustrates a scenario in which a system administrator continues troubleshooting the problem reported by a user. For example, after the system administrator receives a report of quality degradation in a user's collaboration application, the system administrator can proceed to troubleshoot the problem using an integrated interrelations tree that reflects a user-devices-services model built for the user. The system administrator displayed a contextual links selection icon that provided additional troubleshooting options.

In an embodiment, the system administrator requests a display of an endpoint profiling summary 710. As depicted in FIG. 7, the system administrator requests a display of the endpoint profiling summary for a particular laptop computer, and receives a display of information. For example, the information can include data that is related to a collaboration application session established by the user. For example, the collaboration application can be WebEx and the data can relate to a WebEx session that the user established. For example, the display can provide information about the time the user started the WebEx session, the name of the ISE server that the user used to establish the WebEx session, the IP address of the user's devices, the MAC address of the user's device, the policy specification for the endpoint with which the user established the WebEx session, and the endpoint device name. interrelations By inspecting the endpoint profiling summary 710, a system administrator can determine whether the device's names are legitimate, whether the IP addresses and MAC addresses are legitimate, whether a proper policy is assigned to the endpoints, and whether any other information about the endpoints for a particular link is correct.

In an embodiment, an endpoint profiling summary 710 is provided for each action identified for the user. In an example depicted in FIG. 7, an endpoint profiling summary is available for three actions identified for the user.

In the example depicted in FIG. 7, a system administrator has determined that there seems to be no problem or issue with a WebEx session, and no evident problem with assigning a policy to the endpoints of the WebEx session.

Figure 8:
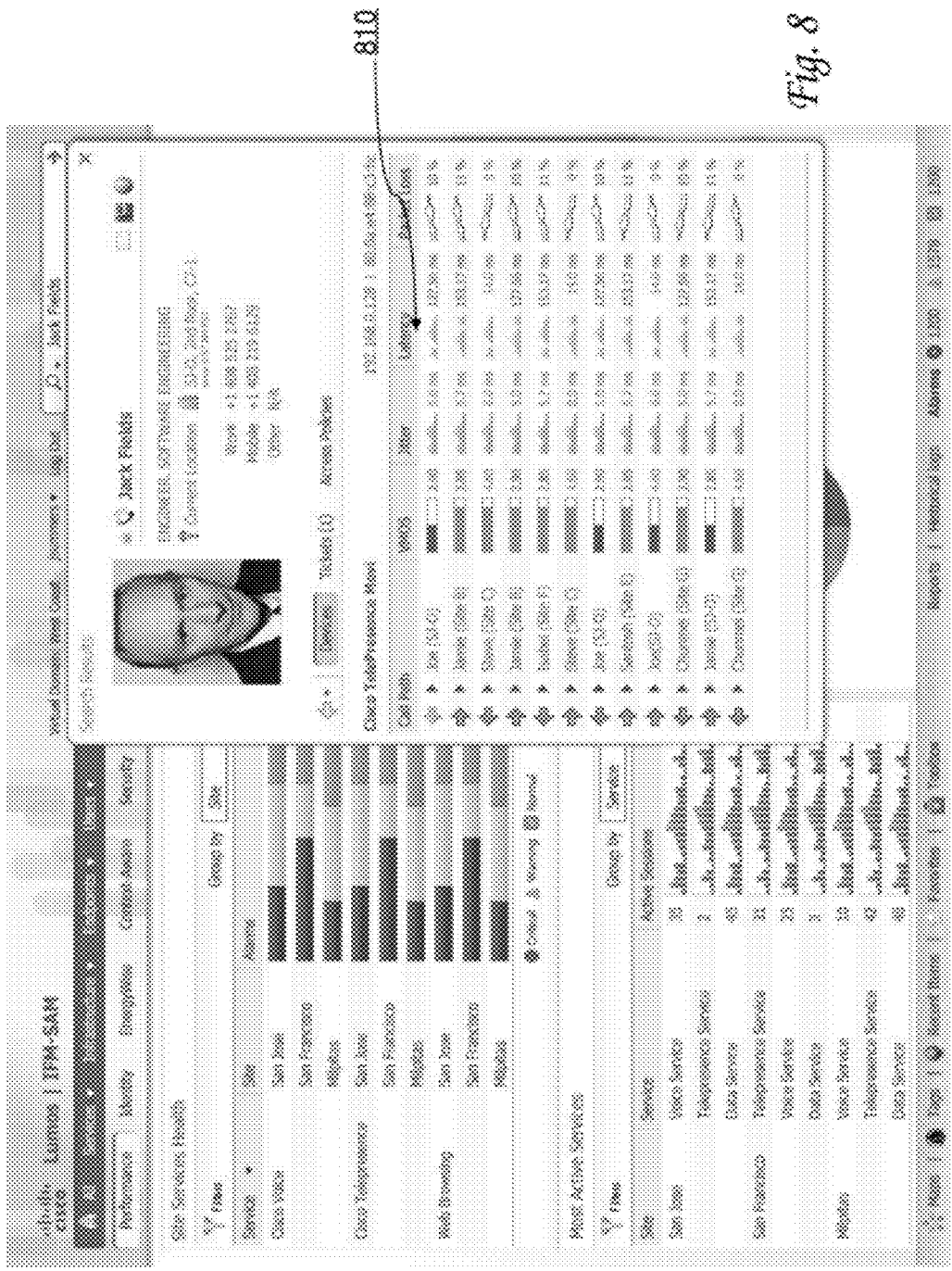
FIG. 8 illustrates the GUI of FIG. 5 with still other different graphical elements.

FIG. 8 illustrates a scenario in which a system administrator continues troubleshooting the problem reported by a user. For example, after the system administrator receives a report of quality degradation in a user's collaboration application, the system administrator proceeds to troubleshoot the problem using an integrated interrelations tree that reflects the user-devices-services model built for the user. In the course of the troubleshooting, the system administrator determines that there seems to be no problem with the user's profile, no problem with establishing a WebEx session or assigning the policy to the endpoints of the WebEx session.

In a next step, a system administrator can request a display of a contextual session view 810. Providing the contextual session view can require traversing an interrelations integrated tree built for the user, and retrieving information about the user's devices, the user's services and the user's connections, described above.

In an embodiment, a system administrator receives a display of the contextual session view 810 for a video conference session established for the user. The display of the contextual session view can comprise a variety of different types of information. For example, the contextual session view can comprise information about call paths, and can be expressed using a VMOS measure. VMOS stands for Video Mean Opinion Score, which is a numerical indication of the perceived quality of the video received over the communications medium—similar to MOS, but instead of voice, it is defined from a video signal.

Other contextual session information can include jitter characteristics, latency characteristics, packets loss, and other information specific to the communications sessions.

In the example depicted in FIG. 8, based on the contextual session view 810, a system administrator can notice that VMOS characteristics for the call path providing collaboration services between user Jack Fields, and another user, Joe, seems to be in a red zone, indicating some problems. That will most likely indicate a degraded level of service for the collaboration or video conference communications session.

In fact, the system administrator can view various aspects and characteristics of the active session. For example, there seems to be an issue related to a packet loss communicated along the collaboration session.

In an embodiment, the system administrator can request a contextual service path analysis for the active collaboration session to find the device that is responsible for causing problems.

In an embodiment, upon determining a device that is most likely responsible for a packet loss along the active session, the system administrator can request an automated DPI analysis. For example, the administrator can request performing a short automated test of the links and devices along the session. To be able to perform the test, the system administrator may need to identify a router, from a plurality of routers presented in the communications path, which has sufficient resource capacity to run the test without impacting packet routing in the network.

Upon performing the test, the system administrator can determine which of the devices or communications links is causing quality degradation in collaboration communications to or from the user.

The above example of quality degradation troubleshooting utilizes generating, traversing and processing one or more integrated interrelations information trees that incorporate a variety of performance and characteristics information. While the information can be collected by a variety of applications and tools, the integrated information trees incorporate interrelations between the tree components regardless of the source that collected the information. The organization of the trees can be changed and modified to provide a flexible and comprehensive model of the performance characteristics.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
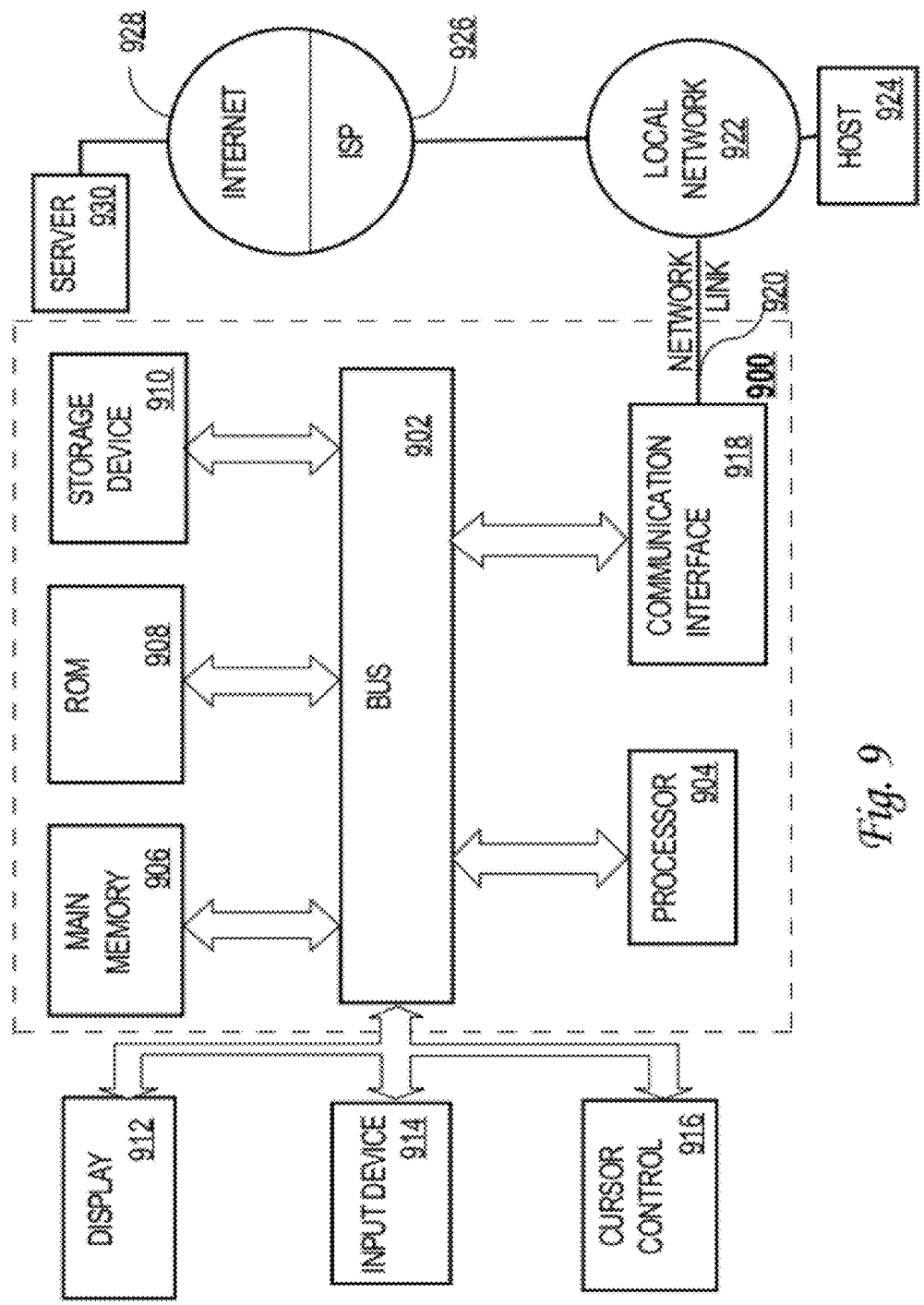
FIG. 9 illustrates a computer system with which embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (LCD, CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

Embodiments include:

1. An internet working device, comprising:
one or more processors;
a collection unit coupled to the one or more processors and configured to perform storing and updating, in a network database, user information;
a monitoring unit configured to perform a first user request for network management information relating to a user;
an interrelation unit configured to perform: based on the first user request and data stored in the network database, determining a first set of user information for the user based on one or more of current, recent, or historical devices that the user used to access a network, connection status, or consumption of applications, services or data; identifying one or more interrelations in the first set of user information that represent logical connections within the first set of user information; using the first set of user information, creating in memory of a network management computer, a first information tree rooted at data representing a user location and organized according to the one or more interrelations;
a graphic user interface action unit configured to perform displaying, based on the first information tree and the one or more interrelations and the first set of user information, network management information for the user comprising one or more of current, recent, or historical devices that the user used to access a network, connection status, or consumption of applications, services or data.

2. The apparatus of Claim 1, wherein the monitoring unit is further configured to perform receiving a second user request different network management information for the user;
the interrelation unit is further configured to perform: based on the second user request, the first information tree and the data stored in the network database, determining a second set of user information for the user; using the second set of user information, creating a second information tree, rooted at a particular interrelation selected from the one or more interrelations, and organized according to modified one or more interrelations in the second set of user information;
the graphical user interface unit further configured to perform displaying the different network management information for the user based on the second information tree, and the one or more interrelations and the second set of user information.

3. The apparatus of Claim 1, wherein
the graphical user interface unit is further configured to perform causing displaying a graphical user interface (GUI) that comprises one or more panels, each of the one or more panels depicting one or more data histograms based on the one or more information trees and the one or more interrelations, and comprising one or more graphical user interface widgets that identify one or more operations; upon receiving a search query identifying a user, retrieving a user profile, displaying the user profile in a profile panel in the GUI, and displaying a data selection icon in the GUI; upon receiving user input selecting a sub-icon of the data selection icon, retrieving a portion of the one or more information trees and displaying the network management information for the user based on the portion.

4. The apparatus of Claim 1, wherein the user information comprises any of user location information, user configuration information, user network information collected by network monitoring processes executed in a communications network, user application information collected by application monitoring processes executed in the communications network, or user performance information collected by performance monitoring processes executed in the communications network.

5. The apparatus of Claim 1, wherein the user information comprises any of current, recent or historical information about endpoints of the connections that the user used to access the communications network, end-to-end break-downs of paths that the user used, or applications, services and data consumption for each of the connections.

6. The apparatus of Claim 1, wherein the user information comprises multiple data metrics related to primary network objects and displayed in a single integrated view.

7. The apparatus of Claim 1, wherein the user information comprises a history of resources usage by the user and a real-time usage of the resources by the user.

8. The apparatus of Claim 1, wherein the user information comprises user location information, user network information, user application information and user performance information.

9. The apparatus of Claim 1, wherein the user information comprises any of: a name of the user, an organization name for the user, contact information for the user, a picture of the user, an electronic mail interface, preference setting for the user, or an authorization and authentication interface.

10. The apparatus of Claim 1, wherein the interrelation unit is further configured to perform creating the one or more information trees and the one or more interrelations based on a real-time profile directory.

What is claimed is:

1. A data processing method comprising:
   receiving, by a computing device, a first request for network management information, the first request identifying at least one of a given user, a user device of the given user, or a user application executed by the given user;
   determining a first set of user information only for the given user based on one or more of user network device accesses, a connection status, or consumption of applications, services, or data, the determination being based on the first request and data stored in a network database;
   wherein the first set of user information comprises performance measurements of two or more devices associated with the given user;
   identifying, based at least in part on the first set of user information, one or more interrelations in the first set of user information that represent logical connections between the two or more devices and logical connections between a device used by the given user and the two or more devices with which the given user communicates;
   creating a first information tree rooted at a particular interrelation selected from the one or more interrelations and organized according to the one or more interrelations, the first information tree being based on the first set of user information and being created in memory of a network management computer; and
   displaying, based on the first information tree, the one or more interrelations and the first set of user information, network management information only for the user comprising the one or more of user network device accesses, the connection status, or the consumption of applications, services or data.

2. The method of claim 1, further comprising:
   receiving a second request for different network management information for the given user, the user device or the user application;
   based on the second request, the first information tree and the data stored in the network database, determining a second set of user information for the user;
   using the second set of user information, creating a second information tree, rooted at data representing a user location of the given user, and organized according to modified one or more interrelations in the second set of user information; and
   causing displaying the different network management information for the user based on the second information tree, and the one or more interrelations and the second set of user information.

3. The method of claim 1, further comprising:
   causing displaying a graphical user interface (GUI) that comprises one or more panels, each of the one or more panels depicting one or more data histograms based on the one or more information trees and the one or more interrelations, and comprising one or more graphical user interface widgets that identify one or more operations;
   upon receiving a search query identifying the user, retrieving a user profile, displaying the user profile in a profile panel in the GUI, and displaying a data selection icon in the GUI; and
   upon receiving user input selecting a sub-icon of the data selection icon, retrieving a portion of the one or more information trees and displaying the network management information for the user based on the portion.

4. The method of claim 1, wherein the network information comprises any of user location information, user configuration information, user network information collected by network monitoring processes executed in a communications network, user application information collected by application monitoring processes executed in the communications network, or user performance information collected by performance monitoring processes executed in the communications network.

5. The method of claim 1, wherein the network information comprises any of current, recent or historical information about endpoints of the connections that the user used to access a communications network, end-to-end break-downs of paths that the user used, or applications, services and data consumption for each of the connections.

6. The method of claim 1, wherein the network information comprises multiple data metrics related to primary network objects and displayed in a single integrated view.

7. The method of claim 1, wherein the network information comprises a history of resources usage by the user and a real-time usage of the resources by the user.

8. The method of claim 1, wherein the network information comprises user location information, user network information, user application information and user performance information.

9. The method of claim 1, wherein the network information comprises any of: a name of the user, an organization name for the user, contact information for the user, a picture of the user, an electronic mail interface, preference setting for the user, or an authorization and authentication interface.

10. The method of claim 1, further comprising creating the one or more information trees and the one or more interrelations based on a real-time profile directory.

11. A non-transitory computer-readable storage medium storing one or more sequences of instructions which, when executed by one or more processors, cause the one or more processors to perform operations comprising:
   receiving a first request for network management information, the first request identifying at least one of a given user, a user device of the given user, or a user application executed by the given user;
   determining a first set of user information only for the given user based on one or more of user network device accesses, a connection status, or consumption of applications, services, or data, the determination being based on the first request and data stored in a network database;

wherein the first set of user information comprises performance measurements of two or more devices associated with the given user;

identifying, based on at least in part on the first set of user information, one or more interrelations that represent logical connections between the two or more devices and logical connections between a device used by the given user and the two or more devices with which the given user communicates;

creating a first information tree rooted at a particular interrelation selected from the one or more interrelations and organized according to the one or more interrelations, the first information tree being based on the first set of user information and being created in memory of a network management computer; and displaying, based on the first information tree, the one or more interrelations and the first set of user information, network management information only for the user comprising one or more of user network device accesses, the connection status, or the consumption of applications, services or data.

12. The non-transitory computer-readable storage medium of claim 11, further storing instructions which, when executed, cause the one or more processors to perform:

receiving a second request for different network management information for the user, the user device or the user application;

based on the second request, the first information tree and the data stored in the network database, determining a second set of user information for the user;

using the second set of user information, creating a second information tree, rooted data representing a user location of the given user, and organized according to modified one or more interrelations in the second set of user information;

causing displaying the different network management information for the user based on the second information tree, and the one or more interrelations and the second set of user information.

13. The non-transitory computer-readable storage medium of claim 11, further comprising instructions which, when executed cause the one or more processors to perform:

causing displaying a graphical user interface (GUI) that comprises one or more panels, each of the one or more panels depicting one or more data histograms based on the one or more information trees and the one or more interrelations, and comprising one or more graphical user interface widgets that identify one or more operations;

upon receiving a search query identifying the user, retrieving a user profile, displaying the user profile in a profile panel in the GUI, and displaying a data selection icon in the GUI; and upon receiving user input selecting a sub-icon of the data selection icon, retrieving a portion of the one or more information trees and displaying the network management information for the user based on the portion.

14. The non-transitory computer-readable storage medium of claim 11, wherein the network information comprises any of user location information, user configuration information, user network information collected by network monitoring processes executed in a communications network, user application information collected by application monitoring processes executed in the communications network, and user performance information collected by performance monitoring processes executed in the communications network.

15. The non-transitory computer-readable storage medium of claim 11, wherein the network information comprises any of current, recent or historical information about endpoints of the connections that the user used to access a communications network, end-to-end break-downs of paths that the user used, and applications, services and data consumption for each of the connections.

16. The non-transitory computer-readable storage medium of claim 11, wherein the network information comprises multiple data metrics related to primary network objects and displayed in a single integrated view.

17. The non-transitory computer-readable storage medium of claim 11, wherein the network information comprises a history of resources usage by the user and a real-time usage of the resources by the user.

18. The non-transitory computer-readable storage medium of claim 11, wherein the network information comprises user location information, user network information, user application information and user performance information.

19. The non-transitory computer-readable storage medium of claim 11, wherein the network information comprises any of: a name of the user, an organization name for the user, contact information for the user, a picture of the user, an electronic mail interface, preference setting for the user, or an authorization and authentication interface.

20. The non-transitory computer-readable storage medium of claim 11, further comprising instructions which, when executed by the one or more processors, cause the processors to perform creating the one or more information trees and the one or more interrelations based on a real-time profile directory.

21. A system comprising:

a user interface device; and one or more computers operable to interact with a user and configured to:

receiving a first request for network management information, the first request identifying at least one of a given user, a user device of the given user, or a user application executed by the given user;

in response to receiving the first request:

determining a first set of user information only for the given user, wherein the first set of user information comprises performance measurements of two or more devices used by the given user, and includes one or more of user network device accesses, a connection status, or consumption of applications, services or data;

creating a first information tree rooted at a particular interrelation selected from the one or more interrelations, and organized according to one or more interrelations in the first set of user information that represent logical connections between the two or more devices and logical connections between a device used by the given user and the two or more devices with which the given user communicates;

displaying, based on the first information tree, network management information on a graphical user interface (GUI) at the user interface device, the network management information only for the user comprising any of: user location information, user configuration information, user network information collected by network monitoring processes executed in a communications network, user application information collected by application monitoring processes executed in the communications network, or user performance information collected by performance monitoring processes executed in the communications network.

22. The system of claim 21, wherein the network management information further comprises user device information, interface information, user information, server information, application information, endpoint information, status or alarm information, and profile information.

23. The system of claim 21, wherein the network management information further comprises any of current, recent or historical information about endpoints of the connections that the user used to access the communications network, end-to-end break-downs of paths that the user used, or applications, services and data consumption for each of the connections.

24. The system of claim 21, wherein the network management information further comprises multiple data metrics related to primary network objects and displayed in a single integrated view.

* * * * *